United States Patent [19]

Gray

[11] Patent Number: 5,218,991

[45] Date of Patent: Jun. 15, 1993

[54] REGULATOR FLOW CONTROL

[75] Inventor: Tommy L. Gray, Dallas, Tex.

[73] Assignee: Span Instruments, Inc., Plano, Tex.

[21] Appl. No.: 872,350

[22] Filed: Apr. 23, 1992

[51] Int. Cl.⁵ .......................................... G05D 16/07
[52] U.S. Cl. ............................ 137/312; 137/505.14; 137/505.42
[58] Field of Search ................. 137/505.14, 505.39, 137/505.42, 312

[56] References Cited

U.S. PATENT DOCUMENTS

| | | | |
|---|---|---|---|
| 1,249,596 | 12/1917 | Cash | 137/505.42 X |
| 2,806,481 | 9/1957 | Faust | 137/505.42 X |
| 3,113,756 | 12/1963 | Griffo | 137/505.42 X |
| 4,413,649 | 11/1983 | Rodd et al. | 137/505.42 X |
| 4,693,267 | 9/1987 | Patterson | 137/505.42 X |
| 4,719,940 | 1/1988 | Beavers | 137/505.42 X |
| 4,828,218 | 5/1989 | Medlock | 137/505.14 X |
| 5,072,749 | 12/1991 | Ligh | 137/505.14 X |

Primary Examiner—Stephen M. Hepperle
Attorney, Agent, or Firm—Harold E. Meier

[57] ABSTRACT

A method and apparatus for a pressure regulator to control the flow of gases through the regulator and control the escape of gases from the regulator base to the regulator bonnet. The pressure regulator contains a flexible rubber diaphragm contacting a flexible diaphragm plate. The flexible diaphragm plate flexes upward or downward in response to changes in the control pressure and engages a pintle valve that controls the entry of gases to the pressure regulator. A system of chambers and passages controls the escape of gases by funneling escaped gases from a catch chamber to an exhaust port.

11 Claims, 1 Drawing Sheet

REGULATOR FLOW CONTROL

TECHNICAL FIELD

The present invention relates to the regulation of gas flow, and more particularly, to the regulation of gas flow to minimize the potential for the escape of gases into the atmosphere.

BACKGROUND OF THE INVENTION

In the production of semiconductor circuit devices, it has been recognized that there is a need to control the toxic gases used in the process in a way to prevent the escape of such gases into the atmosphere. Various types of regulators are in use to control the flow of the toxic gases used in semiconductor circuit device production. These previous attempts to regulate the flow of gases, however, have failed to address the need to effectively control the flow of the toxic gases while also minimizing the possible escape of any of these gases to the surrounding atmosphere.

SUMMARY OF THE INVENTION

In the preferred embodiment of the invention, toxic gases enter the regulator chamber of a regulator assembly through a high pressure inlet port. The high pressure gases are then brought to the correct pressure for a desired flow rate from an output port by means of the control pressure. The control pressure enters the regulator assembly by means of the input control port. The control pressure controls the movement of two diaphragms within the regulator chamber which activate a valve mechanism that regulates the high pressure input to achieve the desired output pressure and flow rate.

For normal regulator operation, the toxic gases exit the regulator chamber through the outlet port. However, if a malfunction occurs, there is a potential hazard of such gases escaping past the diaphragms in the regulator chamber. In accordance with the present invention, the escaping gases will be funneled into catch chambers outside of the regulator chamber and exit the regulator through an exhaust port in the regulator bonnet into an overflow tank.

BRIEF DESCRIPTION OF THE DRAWINGS

For more complete understanding of the present invention and the advantages thereof, reference is now made to the following detailed description taken in conjunction with the accompanying drawing.

The drawing is a cross section of the regulator assembly in accordance with the present invention.

DETAILED DESCRIPTION OF THE DRAWINGS

Figure 1:
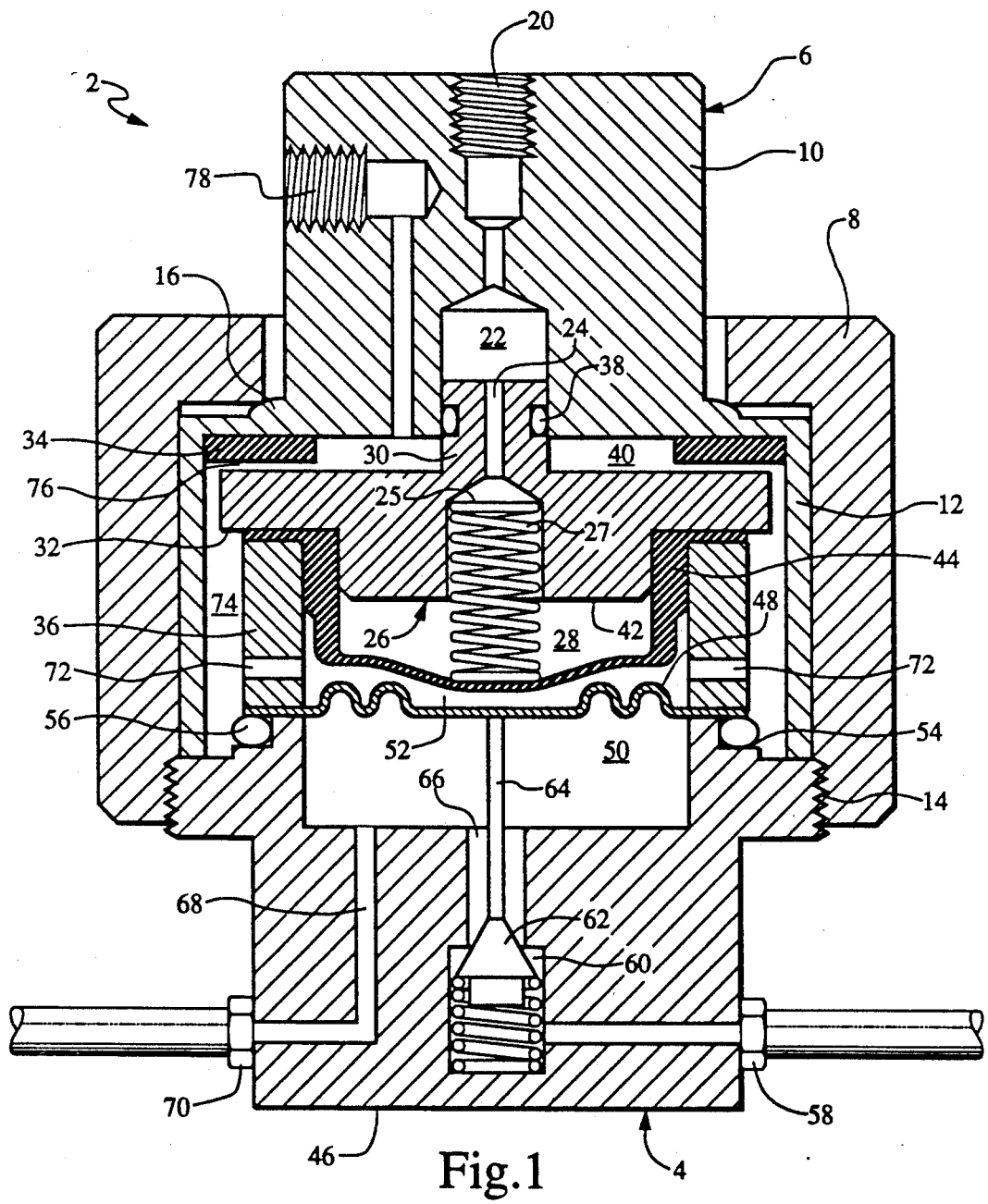

Referring now to the drawing, there is shown the regulator assembly 2, including a regulator base 4, a regulator bonnet 6, and a regulator casing 8.

The regulator bonnet 6 includes a cylindrical top section 10 integral with a larger diameter cylindrical lower section 12 The bottom edge of the lower section 12 is in contact with a flange 14 of the regulator base 4. The bonnet 6 is secured in place by an annular regulator casing ring 8 threadedly engaging the regulator base 4 at the flange 14 and engages the bonnet 6 at a shoulder 16.

Control pressure is applied to the regulator bonnet 6 by means of a control pressure line (not shown). The control pressure line connects to the regulator bonnet 6 at a threaded input port 20. The input port 20 communicates with a bonnet chamber 22. Control pressure in the bonnet chamber 22 is applied by means of a passage 24 to a regulator stopper 26 and pressurizes a control pressure chamber 28. The regulator stopper 26 extends into the bonnet chamber 22 of the regulator bonnet 6 by means of a neck section 30. A flange 32 of the stopper 26 positions the stopper in the assembly between a gasket 34 and a cylindrical positioning ring 36. An O-ring gasket 38 around the neck section 30 of the regulator stopper 26 seals the bonnet chamber 22 from an annular exhaust chamber 40.

Passage 24 opens into a larger chamber 25 within the regulator stopper 26. This chamber 25 contains a spring 27 extending down into the control pressure chamber 28. The spring 27 biases a flexible diaphragm 44 and a flexible diaphragm plate 46 to reduce the pressure difference between the regulated pressure and the control pressure.

The control pressure chamber 28 is defined by the lower surface 42 of the regulator stopper 26 and a flexible diaphragm 44. The diaphragm 44 expands in accordance with the pressure in the control pressure chamber 28. The diaphragm 44 also functions as a seal between the regulator stopper 26 to form the chamber 28.

The regulator base 4 consists of a cylindrical base casing 46 with a threaded flange 14 for engaging the regulator casing 8. A flexible diaphragm plate 48 is positioned between the top edge of the regulator base 4 and the bottom edge of the positioning ring 36 to thereby define a regulator chamber 50 and a catch chamber 52. On a shoulder 54 below the outside edges of the diaphragm plate 48, rests an O-ring gasket 56 forming a seal between the diaphragm plate 40 and the regulator chamber 50.

The high pressure toxic gases enter the regulator base 4 by means of a high pressure inlet connector 58 which is in communication with the inlet valve chamber 60. The inlet valve chamber 60 contains a valve spring 62 to bias a pintle 64 into a closed position The valve spring 62 is connected to pintle 64 which engages the flexible diaphragm plate 48. The inlet valve chamber 60 is in communication with the regulator chamber 50 by means of a passage 66. The regulator base 4 also defines a passage 68 allowing communication between the regulator chamber 50 and pressure outlet connector 70.

To control the outlet pressure and flow of the regulator assembly 2, the control pressure applied to the control pressure chamber 28 is adjusted and the flexible diaphragm 44 expands to engage the flexible diaphragm plate 48 that positions the pintle 64 having one end in contact with the valve spring 62. When the pintle 64 moves against the valve spring 62, the gases applied to the inlet connector 58 enter the regulator chamber 50, and flow out of the regular chamber 50 to the outlet pressure connector 70 by means of the passage 68.

To increase the outlet pressure, the control pressure is increased causing the flexible diaphragm 44 to expand. The flexible diaphragm 44 engages the flexible diaphragm plate 48 causing it to depress the valve spring 62 and open the pintle valve 64. This increases the flow of high pressure gases into the regulator chamber 50 and increases the outlet pressure. The biasing of the diaphragms by the spring 27 allows a control pressure near the value of the regulated pressure to affect the position of the flexible diaphragm plate 48.

To decrease the outlet pressure, the control pressure is decreased causing the flexible diaphragm 44 to contract. The contraction of the flexible diaphragm 44 causes the flexible diaphragm plate 48 to flex upward. This allows the pintle 64 to also move upward to close off the passage 66 thereby decreasing the flow of high pressure gases into the regulator chamber 50 and decreasing the outlet pressure.

Under normal operating conditions, gases will leave the pressure regulator 2 through the outlet pressure connector 70. An advantage of the present invention is that if any gases escape past the flexible diaphragm plate 48, such gases will be captured and not escape to the atmosphere. Gases escaping past the flexible diaphragm plate 48 will be channeled into the catch chamber 52. The channeled gases are then funneled through passageways 72 in the walls of the cylindrical positioning ring 36 to a funnel chamber 74 between the lower bonnet section 12 and the positioning ring 36. The gases then pass through a passageway 76 to an annular exhaust chamber 40. The gases then pass to the exhaust port 78 in communication with the annular exhaust chamber 40. The escaped gases then pass to a holding tank (not shown) and will not be vented to the atmosphere.

Although, only a single embodiment of the invention has been illustrated in the accompanying drawings and the foregoing description, it will be understood that the invention is not limited to the embodiment disclosed but is capable of numerous rearrangements, modifications and substitutions of parts and elements without departing from the spirit of the invention.

I claim:

1. A pressure regulator for controlling the pressure and flow of gases in a pressurized line comprising:
 a regulator base defining an inlet valve chamber in communication with a high pressure inlet connector for receiving high pressure gases, said base further defining an output passage;
 a regulator bonnet attached to the regulator base and defining an exhaust passage, an exhaust port, a bonnet chamber and a control pressure port;
 a regulator casing threadedly engaging the regulator base;
 means for controlling the pressure and flow of the gases leaving the regulator base through the output passage, comprising:
 (a) means for entry of a control pressure; and
 (b) a flexible diaphragm biased to respond to changes in the control pressure; and
 means for controlling the escape of gases from the regulator base to the regulator bonnet.

2. A pressure regulator for controlling the pressure and flow of gases in a pressurized line comprising:
 a regulator base defining an inlet valve chamber in communication with a high pressure inlet connector for receiving high pressure gases, said base further defining an output passage;
 a regulator bonnet attached to the regulator base and defining an exhaust passage, an exhaust port, a bonnet chamber and a control pressure port;
 a regulator casing threadedly engaging the regulator base;
 means for controlling the pressure and flow of the gases leaving the regulator base through the output passage; and
 means for controlling the escape of gases from the regulator base to the regulator bonnet comprising:
 a catch chamber between the regulator chamber and the control pressure chamber;
 a cylindrical positioning ring between the flexible diaphragm plate and the flexible diaphragm containing a plurality of passageways between the catch chamber and a funnel chamber; and
 an exhaust port in communication with the funnel chamber.

3. The pressure regulator of claim 2, wherein the means to control the pressure and flow of gasses leaving the regulator base comprises:
 means for entry of a control pressure;
 a flexible diaphragm responding to changes in the control pressure;
 a flexible diaphragm plate in contact with the flexible diaphragm and engaging a top edge of the regulator base;
 sealing means between the flexible diaphragm plate and the regulator base; and
 valve means positioned by movement of the flexible diaphragm plate.

4. The pressure regulator of claim 3, wherein the means for entry of a control pressure comprises:
 a stopper with a neck positioned within the bonnet chamber, said stopper defining a passage from the bonnet chamber to a control pressure chamber; and
 an O-ring gasket sealing the stopper neck in the bonnet chamber.

5. The pressure regulator of claim 4 further including a spring within the stopper and extending downwardly for biasing the flexible rubber diaphragm and the flexible plate diaphragm.

6. The pressure regulator of claim 3 wherein the valve means comprises:
 a pintle positioned in the inlet valve chamber and extending upward to engage the flexible diaphragm plate; and
 a valve spring biasing the pintle to a closed position.

7. The pressure regulator of claim 3, wherein the sealing means between the flexible diaphragm plate and the regulator base comprises an O-ring gasket.

8. A pressure regulator for controlling the pressure and flow of gases through a pressurized line comprising:
 a regulator base defining an inlet valve chamber in communication with a high pressure inlet connector for receiving high pressure gases;
 a regulator bonnet attached to the regulator base defining an exhaust passage, an exhaust port, a bonnet chamber and a control pressure port;
 a regulator casing threadedly engaging the regulator base;
 a stopper having a neck positioned within the bonnet chamber, said stopper defining a passageway from the bonnet chamber to a control pressure chamber;
 an O-ring gasket sealing the stopper neck in the bonnet chamber;
 a flexible rubber diaphragm responding to changes in the control pressure;
 a flexible diaphragm plate engagable by the rubber diaphragm and positioned on the top edge of the regulator base;
 an O-ring gasket for sealing between the flexible diaphragm plate and the regulator base;
 valve means positionable by the flexible diaphragm plate; and
 a means for controlling the escape of gases from the regulator base to the regulator bonnet.

9. The pressure regulator of claim 8, wherein the valve means comprises:

a pintle positioned in the inlet valve chamber and extending upward to engage the flexible diaphragm plate; and a valve spring biasing the pintle to a closed position.

10. The pressure regulator of claim 8 further including a spring within the stopper and extending downwardly for biasing the flexible rubber diaphragm and the flexible plate diaphragm.

11. The pressure regulator of claim 8, wherein the means for controlling the escape of gas from the regulator base to the regulator bonnet comprises:

a catch chamber between the inlet valve chamber and the control pressure chamber;

a cylindrical positioning ring between the regulator base and the stopper containing a plurality of passageways between the catch chamber and a funnel chamber;

a gasket between the regulator bonnet and the stopper providing a passageway between the funnel chamber and an annular exhaust chamber; and an exhaust port in communication with the annular exhaust chamber.

* * * * *